United States Patent
Ra

(10) Patent No.: US 9,932,925 B2
(45) Date of Patent: Apr. 3, 2018

(54) APPARATUS AND METHOD FOR ENGINE OF VEHICLE

(71) Applicant: Hyundai Motor Company, Seoul (KR)

(72) Inventor: Sung Oh Ra, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 108 days.

(21) Appl. No.: 14/809,232

(22) Filed: Jul. 26, 2015

(65) Prior Publication Data

US 2016/0160786 A1 Jun. 9, 2016

(30) Foreign Application Priority Data

Dec. 3, 2014 (KR) .................. 10-2014-0172130

(51) Int. Cl.
| | | |
|---|---|---|
| *G06F 7/00* | (2006.01) | |
| *F02D 41/26* | (2006.01) | |
| *F02D 41/40* | (2006.01) | |
| *F01N 3/20* | (2006.01) | |
| *F02D 41/04* | (2006.01) | |

(Continued)

(52) U.S. Cl.
CPC ............ *F02D 41/26* (2013.01); *F01N 3/20* (2013.01); *F02D 41/045* (2013.01); *F02D 41/401* (2013.01); *F02D 41/0002* (2013.01); *F02D 41/005* (2013.01); *F02D 41/3809* (2013.01);

(Continued)

(58) Field of Classification Search
CPC ...... F02D 41/26; F02D 41/045; F02D 41/401; F02D 2200/0625; F02D 2200/0802; F02D 41/0002; F02D 41/3809; F02D 41/005; F01N 3/20; Y02T 10/44
See application file for complete search history.

(56) References Cited

U.S. PATENT DOCUMENTS

| | | | | |
|---|---|---|---|---|
| 6,976,936 B2 * | 12/2005 | Yamaoka | ............ | B60W 10/10 123/305 |
| 8,352,150 B2 * | 1/2013 | Hijikata | ............... | F02D 11/105 701/102 |

(Continued)

FOREIGN PATENT DOCUMENTS

| | | |
|---|---|---|
| JP | 2002-061527 A | 2/2002 |
| JP | 2007-055436 A | 3/2007 |

(Continued)

*Primary Examiner* — David Hamaoui

(74) *Attorney, Agent, or Firm* — Mintz Levin Cohn Ferris Glovsky and Popeo, P.C.; Peter F. Corless

(57) ABSTRACT

A method of improving fuel efficiency and an apparatus for operating a vehicle that performs the method are provided. The apparatus includes a storing unit that stores control plans for a fuel injection system and an intake/exhaust system that optimize responsiveness of an engine for a plurality of driving modes. A catalyst temperature obtaining unit obtains a catalyst temperature and an operation period determining unit determines an operation period of an engine based on rpm of the engine and an amount of fuel consumption. A driving mode determining unit determines any one of the driving modes as a current driving mode based on the catalyst temperature, the operation period, and present time. Additionally, a controller is configured to access a control plan that corresponds to the current driving mode and operate the fuel injection system and the intake/exhaust system based on the control plan corresponding to the current driving mode.

12 Claims, 6 Drawing Sheets

(51) Int. Cl.
*F02D 41/00* (2006.01)
*F02D 41/38* (2006.01)

(52) U.S. Cl.
CPC .............. *F02D 2200/0625* (2013.01); *F02D 2200/0802* (2013.01); *Y02T 10/44* (2013.01)

(56) References Cited

U.S. PATENT DOCUMENTS

| | | | |
|---|---|---|---|
| 8,727,049 B1* | 5/2014 | Rosen | B60W 10/06 180/65.265 |
| 9,333,975 B2* | 5/2016 | Szwabowski | B60W 50/00 |
| 2005/0177293 A1* | 8/2005 | Ammann | B60K 31/04 701/54 |
| 2006/0247093 A1 | 11/2006 | Berglund et al. | |
| 2013/0297185 A1* | 11/2013 | Morris | F02D 11/105 701/104 |
| 2014/0229048 A1* | 8/2014 | Kawata | B60K 6/48 701/22 |
| 2014/0366840 A1* | 12/2014 | Sivasubramanian | F02D 41/0025 123/399 |

FOREIGN PATENT DOCUMENTS

| | | |
|---|---|---|
| JP | 2007-107529 A | 4/2007 |
| JP | 2010-058745 A | 3/2010 |
| KR | 10-1034020 B1 | 5/2011 |

\* cited by examiner

APPARATUS AND METHOD FOR ENGINE OF VEHICLE

CROSS-REFERENCE TO RELATED APPLICATION

This application claims priority to and the benefit of Korean Patent Application No. 10-2014-0172130 filed in the Korean Intellectual Property Office on Dec. 3, 2014, the entire contents of which are incorporated herein by reference.

BACKGROUND (a) Field of the Invention

The present invention relates to an apparatus and a method for controlling an engine of a vehicle, and more particularly, to an apparatus and a method for controlling an engine of a vehicle that satisfy exhaust gas regulations and maximize fuel efficiency by classifying driving modes of the vehicle.

(b) Description of the Related Art

Environmental regulations regarding noxious materials in exhaust gases from vehicles have been increasingly enhanced in many countries. Accordingly, vehicles are equipped with various types of catalyst devices for removing noxious materials such as nitrogen oxide (NOx), carbon monoxide (CO), and tetrahydrocannabinol (THC) contained in exhaust gases under those regulations on exhaust gases.

To satisfy these regulations, a purifying process is required to be performed by more rapidly activating catalysts in an exhaust gas post-processing apparatus. A method of controlling a fuel injection system, for example, delay of injection timing and post-injection, or a method of controlling an intake/exhaust system such as adjusting the amount of exhaust gas recirculation (EGR) is used to allow a catalyst to rapidly reach an activation temperature.

However, when the injection timing is substantially delayed or post-injection is performed, the amount of fuel consumed regardless of power generation by an engine may increase and thus reduce fuel efficiency. Further, excessive adjustment of the amount of EGR may be accompanied by various side effects such as an increase in pumping loss and smoke due to insufficient air. Additionally, in the related art, responsiveness of engines has been standardized under severe driving conditions, that is, driving conditions with substantially high speeds and frequent acceleration/deceleration to satisfy regulations on exhaust gases. However, standardizing the responsiveness of engines may cause a decrease in fuel efficiency in driving at a relatively constant speed and with relatively less rapid acceleration.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method having advantages of controlling an engine of a vehicle that satisfy exhaust gas regulations and maximize fuel efficiency by classifying driving modes of the vehicle.

An exemplary embodiment of the present invention provides an apparatus for controlling an engine of a vehicle that may include: a storing unit configured to store control plans for a fuel injection system and an intake/exhaust system that optimize responsiveness of an engine for a plurality of driving modes; a catalyst temperature obtaining unit configured to obtain a catalyst temperature; an operation period determining unit configured to determine an operation period of an engine based on the revolutions per minute (rpm) of the engine and an amount of fuel consumption; a driving mode determining unit configured to determine any one of the driving modes as a current driving mode based on the catalyst temperature, the operation period, and present time; and a controller configured to access a control plan that corresponds to the current driving mode and operate the fuel injection system and the intake/exhaust system based on the control plan that corresponds to the current driving mode.

The control plans may each include first control information regarding the fuel injection system and the intake/exhaust system in a substantially constant speed running state and second control information regarding the fuel injection system and the intake/exhaust system in a transient state, and the controller may be configured to operate the fuel injection system and the intake/exhaust system based on the first control information in the substantially constant speed running state, and operate the fuel injection system and the intake/exhaust system based on the second control information in the transient state.

The first control information may include fuel injection timing by the fuel injection system, pressure of a common rail, a supply amount by a turbocharger, and an exhaust gas recirculation amount. The second control information may include a smoke fuel limit and an exhaust gas recirculation amount that depend on gear ratios, and the exhaust gas recirculation amount may be set to decrease as the gear ratio increases.

The driving mode determining unit may be configured to obtain a determination value for a first driving mode by summing a first determination value based on the catalyst temperature, a second determination value based on the operation period, and a third determination value based on the present time, and determine the current driving mode based on the determination value for the first driving mode.

The driving mode determination unit may further be configured to apply different weight values to the determination value for the first driving mode, a determination value for a second driving mode obtained before the determination value for the first driving mode is obtained, and a determination value for a third driving mode that corresponds to a determination value for an average driving mode, obtain a determination value for the final driving mode by summing the determination values for the first, second, and third driving modes to which the weight values have been applied, and may be configured to select any one of the driving modes as the current driving mode based on the determination value for the final driving mode.

Another exemplary embodiment of the present invention provides a method of controlling an engine of a vehicle that may include: obtaining a catalyst temperature; determining an operation period of an engine based on the rpm of the engine and an amount of fuel consumption; determining any one of the driving modes as a current driving mode based on the catalyst temperature, the operation period, and present time; and operating a fuel injection system and an intake/exhaust system based on a control plan that corresponds to the current driving mode, of control plans for the fuel injection system and the intake/exhaust system set to optimize responsiveness of an engine for a plurality of driving modes.

The operation of a fuel injection system and an intake/exhaust system may include operating the fuel injection system and the intake/exhaust system based on first control information when a vehicle is driven at a substantially constant speed, and operating the fuel injection system and the intake/exhaust system based on second control information when a vehicle is in a transient state.

The determining of a driving mode may include obtaining a determination value for a first driving mode by summing a first determination value based on the catalyst temperature, a second determination value based on the operation period, and a third determination value based on the present time, and determining the current driving mode based on the determination value for the first driving mode.

The determination of a driving mode may include: applying different weight values to the determination value for the first driving mode, a determination value for a second driving mode obtained before the determination value for the first driving mode is obtained, and a determination value for a third driving mode that corresponds to a determination value for an average driving mode; obtaining a determination value for the final driving mode by summing the determination values for the first, second, and third driving modes to which the weight values have been applied; and selecting any one of the driving modes as the current driving mode based on the determination value for the final driving mode.

According to exemplary embodiments of the present invention, it may be possible to satisfy regulations on exhaust gases and improve fuel efficiency by optimizing responsiveness of an engine according to driver's driving features.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DETAILED DESCRIPTION

Figure 1:
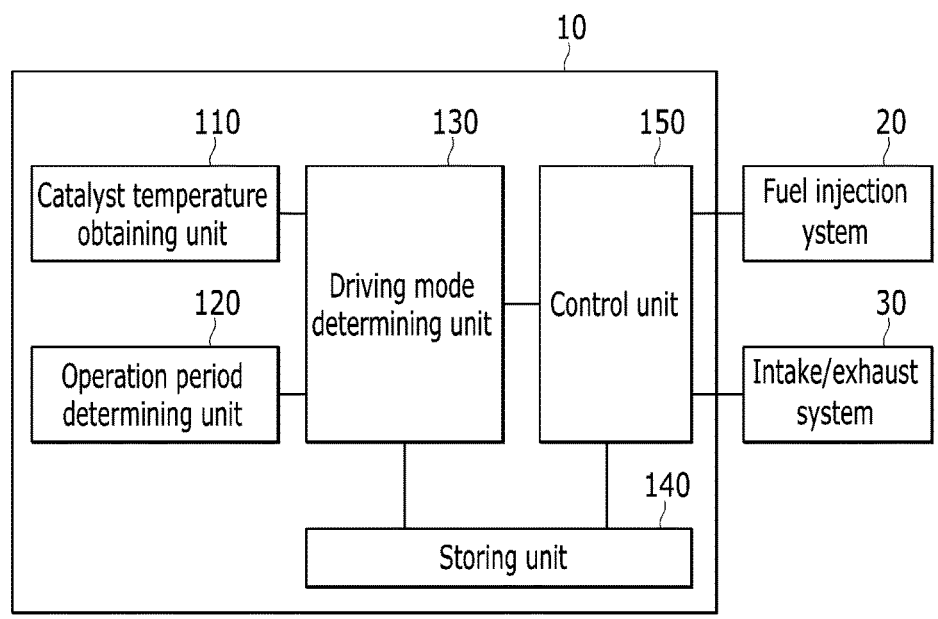
FIG. 1 is a diagram illustrating the configuration of an apparatus for controlling an engine of a vehicle according to an exemplary embodiment of the present invention.

Hereinafter, exemplary embodiments of the present invention will be described in detail with reference to the accompanying drawings such that those skilled in the art can easily achieve the present invention. The present invention may be implemented in various ways and is not limited to the exemplary embodiments described herein. Parts that are unrelated to the description of the exemplary embodiments are not shown to make the description clear, and like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Throughout this specification and the claims that follow, when it is described that an element is "coupled" to another element, the element may be "directly coupled" to the other element or "electrically coupled" to the other element through a third element. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An apparatus and a method of controlling an engine of a vehicle according to exemplary embodiments of the present invention will be described with corresponding drawings.

Figure 2:
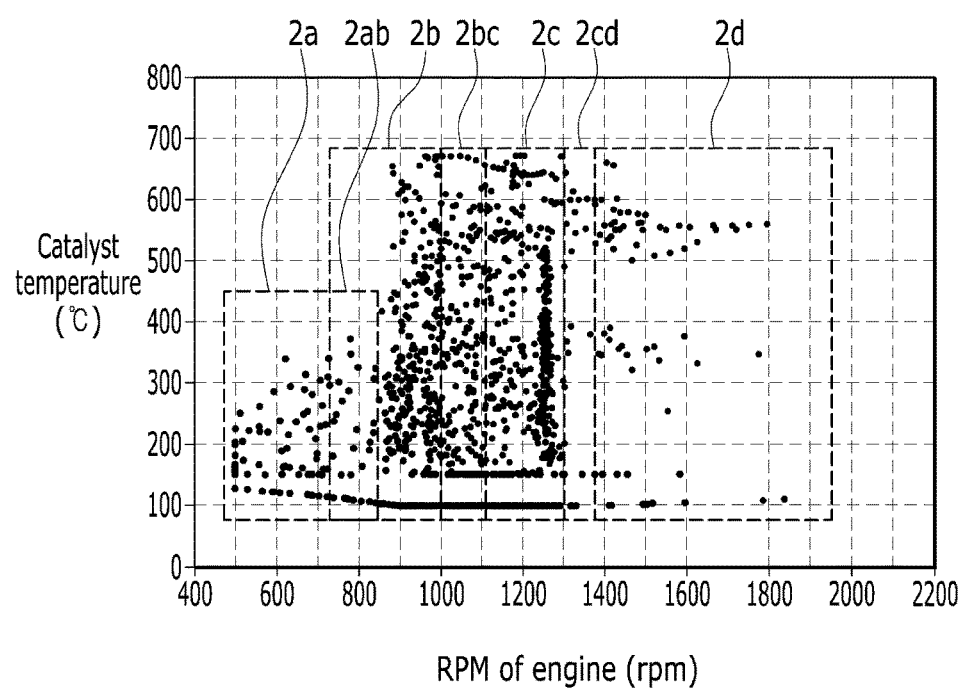
FIG. 2 is a diagram illustrating a method of calculating a determination value according to a catalyst temperature of the apparatus for controlling an engine of a vehicle according to an exemplary embodiment of the present invention.
Figure 3:
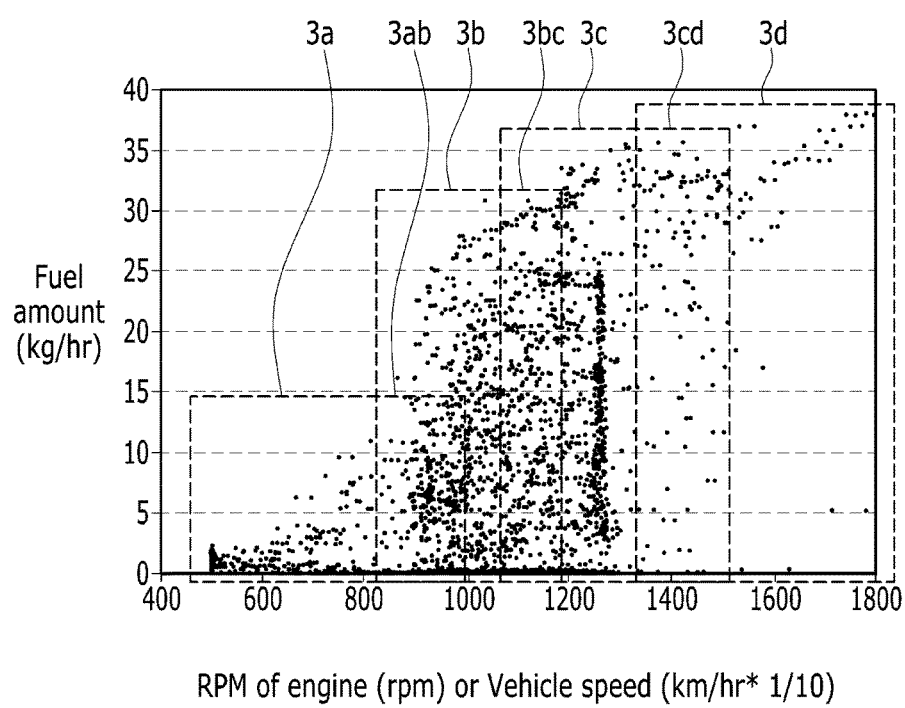
FIG. 3 is a diagram illustrating a method of calculating a determination value according to operation periods of an engine of the apparatus for controlling an engine of a vehicle according to an exemplary embodiment of the present invention.
Figure 4:
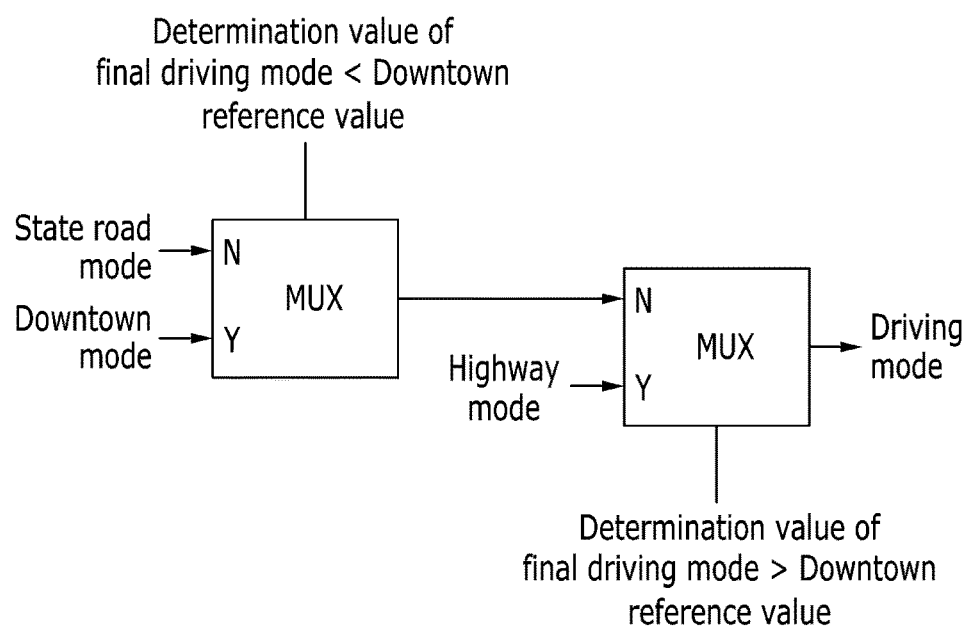
FIG. 4 is a diagram showing exemplary control logic for determining a driving mode in the apparatus for controlling an engine of a vehicle according to an exemplary embodiment of the present invention.
Figure 5:
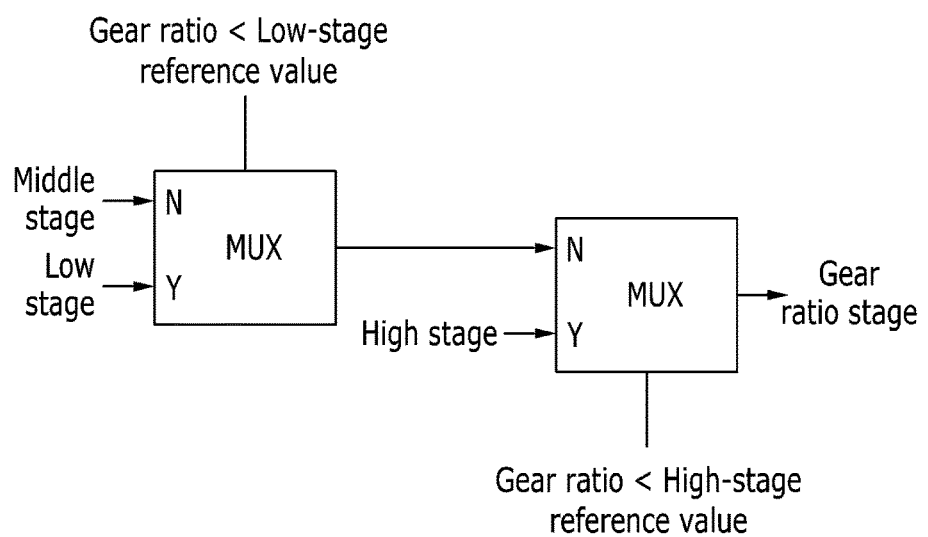
FIG. 5 is a diagram showing exemplary control logic for determining a gear ratio stage in the apparatus for controlling an engine of a vehicle according to an exemplary embodiment of the present invention.

FIG. 1 is a diagram illustrating the configuration of an apparatus for controlling an engine of a vehicle according to an exemplary embodiment of the present invention. FIG. 2 is a diagram illustrating a method of calculating a determination value according to a catalyst temperature, and FIG. 3 is a diagram illustrating a method of calculating a determination value according to operation periods of an engine. FIG. 4 is a diagram showing exemplary control logic for determining a driving mode in the apparatus for controlling an engine of a vehicle according to an exemplary embodiment of the present invention. FIG. 5 is a diagram showing exemplary control logic for determining a gear ratio stage in the apparatus for controlling an engine of a vehicle according to an exemplary embodiment of the present invention.

Referring to FIG. 1, an apparatus 10 for controlling an engine of a vehicle may include a catalyst temperature obtaining unit 110, an operation period determining unit 120, a driving mode determining unit 130, a storing unit 140, and a controller 150. The components shown in FIG. 1 are not essential, so an apparatus 10 for controlling an engine of a vehicle according to an exemplary embodiment of the present invention may include more or less components. Additionally, the controller 150 may be configured to operate the various units of the apparatus 10.

In particular, the catalyst temperature obtaining unit 110 may be configured to obtain (e.g., detect or measure) a catalyst temperature using a temperature sensor. For example, the catalyst temperature obtaining unit 110 may be configured to obtain a catalyst temperature using a temperature sensor disposed on a catalyst device (not shown). A catalyst may be used to purify noxious materials such as hydrocarbons (HC), carbon monoxide (CO), and nitrogen oxides (NOx) from exhaust gas produced by an engine. The catalyst induces an oxidation reaction of hydrocarbon and carbon monoxide and a reduction reaction of nitrogen oxide by impregnating precious metals including platinum, palladium, and rhodium with aluminum as a base.

Further, the catalyst has a purifying ability that increases as the temperature increases. When the catalyst does not reach an activation temperature, the ability to purify noxious materials decreases, and thus the catalyst may not oxidize or reduce noxious materials and allow these materials to be discharged to the atmosphere, and accordingly, emissions may be deteriorated. Therefore, responsiveness of an engine should be appropriately set based on the catalyst temperature to optimize the responsiveness of the engine without deteriorating emissions. Thus, the driving mode determining unit 130 to be described below may use the catalyst temperature as a determination parameter to determine an operation mode for mapping responsiveness of an engine.

Furthermore, the operation period determining unit 120 may be configured to determine the operation period of an engine based on the current rpm of the engine (e.g., a vehicle speed) and the amount of fuel consumption. Referring to FIG. 3, the operation period of an engine may be divided into a plurality of operation periods 3a, 3b, 3c, and 3d based on the relationship between the rpm of the engine and the amount of fuel consumption. Accordingly, the operation period determining unit 120 may be configured to determine the current operation period of an engine from the operation periods 3a, 3b, 3c, and 3d based on the current rpm of the engine and the amount of fuel consumption.

The operation periods of an engine may depend on the running speed and driving features such as acceleration and deceleration features or intentions of a driver, and the responsiveness of an engine may also depend on the operation periods. Accordingly, the driving mode determining unit 130 to be described below may use the operation modes of an engine as estimation parameters to determine an operation mode for mapping responsiveness of an engine.

Particularly, the driving mode determining unit 130 may be configured to determine driving modes of a vehicle based on the catalyst temperature, the current operation period of an engine, and the present time. The driving mode determining unit 130 may be configured to obtain a determination value based on the catalyst temperature obtained by the catalyst temperature obtaining unit 110 to determine driving modes.

Referring to FIG. 2, a plurality of catalyst temperature sections 2a, 2b, 2c, and 2d may be divided based on a relationship between the catalyst temperature and the rpm of an engine of a vehicle, and different determination values may be applied to the catalyst temperature sections 2a, 2b, 2c, and 2d. Accordingly, the driving mode determining unit 130 may be configured to determine which one of the catalyst temperature sections 2a, 2b, 2c, and 2d the current catalyst temperature pertains to and obtain a determination value based on the catalyst temperature in accordance therewith.

As illustrated in FIG. 2, when two adjacent catalyst temperature sections overlap each other, the average value of determination values that correspond to the two adjacent catalyst temperature sections may be used for the determination values of overlapping sections 2ab, 2bc, and 2cd. For example, when the rpm of an engine is about 800 and the catalyst temperature is about 300° C., the current catalyst temperature pertains to the overlap section between the first catalyst temperature section 2a and the second catalyst temperature section 2b. Accordingly, the driving mode determining unit 130 may be configured to determine the average value of determination values that corresponds to the first catalyst temperature section 2a and the second catalyst temperature section 2b as a determination value based on the current catalyst temperature.

Additionally, the driving mode determining unit 130 may be configured to obtain a determination value based on the operation period of the engine to determine the driving mode. Referring to FIG. 3, the plurality of operation periods 3a, 3b, 3c, and 3d may be divided based on the relationship between the amount of fuel consumption and the rpm of an engine of a vehicle (e.g., a vehicle speed), and different determination values may be applied to the operation periods 3a, 3b, 3c, and 3d. When the operation period determining unit 120 determines which one of the operation periods 3a, 3b, 3c, and 3d the engine operates in, the driving mode determining unit 130 may be configured to obtain a corresponding determination value as a determination value based on the current operation period of the engine.

As illustrated in FIG. 3, when two adjacent operation periods overlap each other, the average value of determination values that correspond to the two adjacent operation periods may be used for a weight value of overlapping sections 3ab, 3bc, 3cd. For example, when the current rpm of an engine is about 900 and the amount of fuel consumption is about 5 kg/h, the operation period of the engine pertains to the overlap section between the first operation period 3a and the second operation period 3b. Accordingly, the operation mode determining unit 130 may be configured to obtain the average value that corresponds to the first operation period 3a and the second operation period 3b as the determination value that corresponds to the current operation period of the engine.

Furthermore, the driving mode determining unit 130 may be configured to obtain a determination value based on the present time to determine the driving mode. Road characteristics and traffic flow may depend on driving time zones. In addition, driving features (e.g., intention, pattern, or the like) of a driver may depend on road characteristics and traffic flow. For example, during rush hour, traffic may be heavy and thus the vehicle may be driven at substantially low speeds and may be frequently accelerated and decelerated (e.g., frequent engagement of the accelerator pedal and the brake pedal by the driver) due to traffic jams (e.g., obstructions). Such a driving feature influences responsiveness of an engine and thus, the driving mode determining unit 130 may use the present time as a determination parameter in the process of determining driving modes to determine a plan to operate a fuel injection system 20 and an intake/exhaust system 30.

According to an exemplary embodiment of the present invention, a plurality of time periods may be divided based on statistics according to time such as road characteristics and traffic flow, and different determination values may correspond to the time periods. Thus, the driving mode determining unit 130 may be configured to obtain a determination value based on which time period the current time pertains to.

When determination values based on the catalyst temperature, the operation period of an engine, and the present time are obtained, as described above, the driving mode determining unit 130 may be configured to calculate a sum thereof. Further, the driving mode determining unit 130 may be configured to calculate an average value after accumulating the sums of determination values for a predetermined time (e.g., about five minutes), and calculate the average of the sums of the determination values as a determination value for the current driving mode.

The driving mode determining unit 130 may further be configured to obtain the determination value of the final driving mode through learning control to improve reliability in determination of a driving mode. In other words, when a determination value for the current driving mode is calculated, as described above, the driving mode determining unit 130 may be configured to obtain the determination value of the final operation mode by applying different weight values to the determination value of the current driving mode, the determination value of the previous driving mode, and the determination value of the average driving mode, and then summing the determination values of the driving modes to which the weight values have been applied.

The determination value of the previous driving mode may be the determination value of a driving mode obtained most recently in the determination values of driving modes obtained before the determination value of the current driving mode, and may be selected as the determination value of the previous driving mode when the driving time is greater than a predetermined time (e.g., about over an hour). The average determination value of driving modes may be an average value of determination values of driving modes to the previous day, and may be obtained by accumulating determination values of driving modes to the previous day and then calculating the average value thereof. When the determination value of the final driving mode is obtained, the driving mode determining unit 130 may be configured to determine any one of a plurality of driving modes (e.g., a state road mode, a downtown mode, and a highway mode) as the current driving mode based on the determination value.

Referring to FIG. 4, the driving mode determining unit 130 may be configured to select either one of a state road mode and a downtown mode by comparing the determination value of the final driving mode and a downtown reference value. In other words, when the determination value of the final driving mode is less than the downtown reference value, the downtown mode may be selected, and when the determination value of the final driving mode is greater than the downtown reference value, the state road mode may be selected. Thereafter, when either one of the state road mode and the downtown mode is selected, the driving mode determining unit 130 may be configured to select one of the selected mode and the highway mode as the final driving mode based on the comparison of the determination value of the final driving mode with a high-speed reference value.

In other words, when the determination value of the final driving mode is greater than the high-speed reference value, the highway mode may be selected as the driving mode, and when the determination value of the final driving mode is less than the high-speed reference value, a mode selected from the state road mode and the downtown mode may be selected as the driving mode.

The storing unit 140 may be configured to store data processed by the apparatus 10 to operate an engine of a vehicle. The storing unit 140, as shown in FIG. 2, may be configured to store section information (e.g., the rpm range of an engine and the catalyst temperature range in the catalyst sections) to categorize the catalyst sections 2a, 2b, 2c, and 2d and determination values for the catalyst sections. Further, the storing unit 140, as shown in FIG. 3, may be configured to store section information (e.g., the rpm range of an engine and the fuel consumption amount range in the catalyst sections) to categorize the operation periods 3a, 3b, 3c, and 3d and determination values for the operation periods. The storing unit 140 may also be configured to store information for categorizing time periods and determination values for the time periods.

In addition, the storing unit 140 may be configured to store different plans for controlling the fuel injection system 20 and the intake/exhaust system for a plurality of driving modes. The plans for controlling the fuel injection system 20 and the intake/exhaust system 30 in the driving modes may be established to improve fuel efficiency by optimizing responsiveness of an engine in the range of satisfying emissions based on the catalyst temperature in the driving modes and the operation periods of the engine. The plans for controlling the fuel injection system 20 and the intake/exhaust system 30 in the driving modes may be set in advance though a test or simulation.

The storing unit 140 may further be configured to store different plans for controlling the fuel injection system 20 and the intake/exhaust system 30 in a substantially constant-speed running state and a transient state for the driving modes. Additionally, the plan for controlling the fuel injection system 20 may include control information related to fuel injection in a vehicle. The control information of the fuel injection system 20 in the constant-speed running state may include the timing of fuel injection by a fuel injector (not shown) and the pressure of a common rail.

Particularly, fuel flows into the common rail at a substantially high pressure to maintain the pressure while it flows along a supply line, and the fuel may be supplied to a plurality of fuel injectors via distribution channels connected to the common rail and then injected into combustion chambers of an engine. In this process, the pressure of the common rail and the injection timings of the fuel injectors determine the responsiveness of the engine, and may be used as parameters for determining the discharge amount of noxious materials by influencing the catalyst temperature. The plan for controlling the intake/exhaust system 30 may include control information relating to intake/exhaust of a vehicle. The control information of the intake/exhaust system 30 in the substantially constant-speed running state may include the supply amount by a turbocharger and an amount of exhaust gas recirculation.

A turbocharger is a device configured to compress intake air with the pressure of an exhaust gas and supply the air to the engine via an intake line, an exhaust gas recirculation (EGR) system is a system configured to supply an exhaust gas to the engine via the intake line, and the supply amount by the turbocharger and the EGR amount by the EGR system determine the responsiveness of the engine and may be used as parameters for determining the discharge amount of noxious materials by influencing the catalyst temperature.

The driving information of the fuel injection system 20 and the intake/exhaust system 30 in the transient state may be set differently based on a gear ratio even in the same driving mode. In other words, the control information of the fuel injection system 20 and the intake/exhaust system 30 may be set based on a gear ratio for the driving modes. For example, the gear ratio may be divided into three stages of a low stage, a middle stage, and a high stage, and the control information of the fuel injection system 20 and the intake/exhaust system 30 may be set at the gear ratios for the driving modes.

The control information of the fuel injection system 20 in the transient state may include a smoke fuel limit based on a gear ratio. The smoke fuel limit may be the maximum fuel amount set based on intake air pressure to prevent incomplete combustion due to insufficient intake air, and the time required to reach a desired fuel injection amount may be adjusted based on the smoke fuel limit. In other words, by the smoke fuel limit, a fuel injection rate may be adjusted and the time required to reach the desired fuel injection amount may be adjusted. The smoke fuel limit in the transient state may be set such that as the gear ratio decreases, the fuel injection rate increases and the time required to reach the desired fuel injection amount may decrease and such that as the gear ratio increases, the fuel injection speed decreases and the time required for the desired fuel injection amount may increase.

The control information of the intake/exhaust system in the transient state may include an EGR amount based on a gear ratio. In other words, the control information of the intake/exhaust system in the transient state may determine how to adjust the EGR amount based on a gear ratio. In the transient state, the EGR amount may be set to decrease as the gear ratio increases. The controller 150 may be configured to access the plans from the storing unit 140 to operate the fuel injection system 20 and the intake/exhaust system 30 corresponding to a driving mode determined by the driving mode determining unit 130.

When a vehicle is operating at a substantially constant speed, the controller 150 may be configured to access from the storing unit 140 a control plan that corresponds to the constant-speed running state of control plans corresponding to the current driving mode. Further, when a vehicle is in the transient state, for example, by accelerating or decelerating, the controller 150 may be configured to access from the storing unit 140 the control plan that corresponds to the transient state of control plans corresponding to the current driving mode. The control plan in the transient state may depend on gear ratios. For example, the gear ratio may be divided into three stages of a low stage, a middle stage, and a high stage, and different control plans may be set for each stage. Accordingly, the controller 150 may be configured to determine which stage the current gear ratio pertains to, and access from the storing unit 140 the control plan that corresponds to the stage to which the current gear ratio pertains.

FIG. 5 is a diagram showing an example of control logic for determining a gear ratio stage by the controller 150. Referring to FIG. 5, the controller 150 may be configured to determine which stage the current gear ratio pertains to based on a predetermined low-stage reference value and high-stage reference value.

First, the controller 150 may be configured to select any one of the middle stage and the low stage by comparing the current gear ratio with the low-stage reference value. In other words, when the gear ratio is less than the low-stage reference value, the low stage may be selected, and when the gear ratio is greater than the low-stage reference value, the middle stage may be selected. Thereafter, the controller 150 may be configured to select one stage from the low stage, the middle stage, and the high stage as the final gear ratio stage based on the comparison of the gear ratio with the high-step reference value. In other words, when the gear ratio is greater than the high-stage reference value, the high stage may be selected as the final gear ratio stage, and when the gear ratio is less than the high-stage reference value, a stage selected from the middle stage and the low stage may be selected as the final gear ratio stage.

As described above, when the controller 150 accesses a control plan from the storing unit 140, the controller 150 may be configured to adjust discharge of exhaust gas from a vehicle and the responsiveness of an engine by operating the fuel injection system 20 and the intake/exhaust system 30 based on the control plan.

Figure 6:
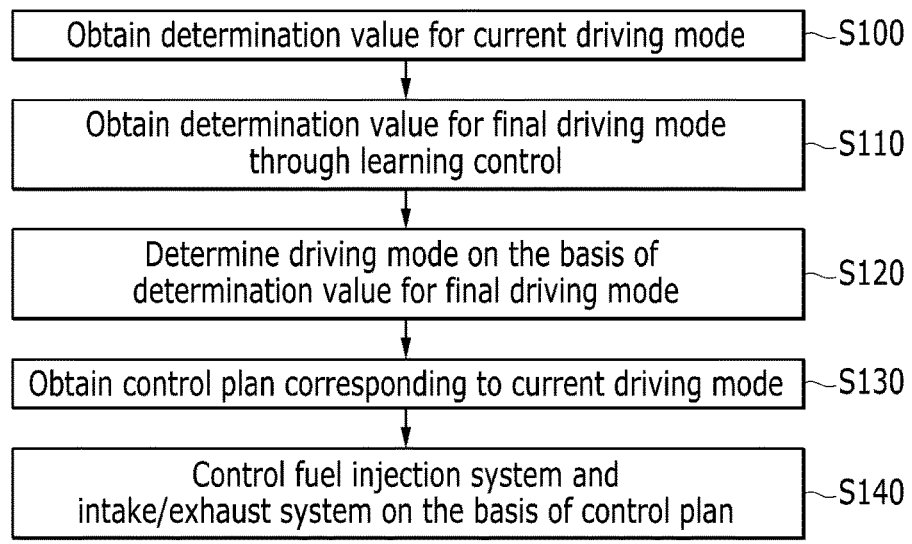
FIG. 6 is a flowchart illustrating a method of controlling an engine of a vehicle according to an exemplary embodiment of the present invention.

FIG. 6 is a flowchart illustrating a method of controlling an engine of a vehicle according to an exemplary embodiment of the present invention. The method of FIG. 6 may be executed by the controller 150. Referring to FIG. 6, the apparatus 10 for controlling an engine of a vehicle according to an exemplary embodiment of the present invention may be configured to calculate a determination value of the current driving mode based on a catalyst temperature, an operation period of an engine, and the present time (S100).

In S100, the apparatus 10 for controlling an engine of a vehicle may be configured to obtain the catalyst temperature from the catalyst temperature obtaining unit 110, and determine which section of a plurality of predetermined catalyst sections (see 2a, 2b, 2c, and 2d in FIG. 2) the current catalyst temperature pertains to (e.g., corresponds to). Further, the apparatus may be configured to calculate a determination value based on the catalyst temperature in accordance with the determination result. In S100, the apparatus 10 for controlling an engine of a vehicle may be configured to determine which operation period of a plurality of predetermined operation periods (see 3a, 3b, 3c, and 3d in FIG. 3) it pertains to, through the operation period determining unit 120. The apparatus may also be configured to calculate a determination value based on the operation period of the engine in accordance with the determination result.

In S100, the apparatus 10 may be configured to determine which period of a plurality of predetermined time periods the present time pertains to, and calculate a determination value according to time in accordance with the determination result. In S100, when determination values based on the catalyst temperature, the operation period, and the time are calculated, the apparatus 10 may be configured to calculate the determination value of the current driving mode by summing the determination values.

When the determination value of the current driving mode is calculated in S100, the apparatus 10 may be configured to apply different weight values to the determination value of the current driving mode, the determination value of the previous driving mode, and the determination value of the average driving mode, and obtain the determination value of the final driving mode by summing the determination values of the driving modes to which the weight values have been applied (S110).

In S110, the determination value of the previous driving mode may be the determination value of a driving mode obtained for the latest running, and the determination value of the average driving mode may be an average value of the determination values of the driving modes to the previous day and may be obtained by accumulating the determination values of the driving modes to the previous day and calculating an average value thereof. In addition, in S110, the apparatus 10 may be configured to apply a greater weight value to determination values most recently determined, or the determination value of the current driving mode, the determination value of the previous driving mode, and the determination value of the average driving mode. In other words, it may be possible to apply a greatest weight value to the determination value of the current driving mode and a smallest weight value to the determination value of the average driving mode.

When the apparatus 10 obtains the determination value for the final driving mode in S110, the apparatus 10 (operated by the controller) may be configured to determine any one of a plurality of predetermined driving modes (e.g., a state road mode, a downtown mode, and a highway mode) as the current driving mode (S120). The apparatus 10 may then be configured to access a control plan that corresponds to the driving mode determined in S120 from the storing unit 140 (S130), and operate the fuel injection system 20 and the intake/exhaust system 30 based on the accessed control plan (S140).

In S130, when a vehicle is driven at a substantially constant speed, the apparatus 10 may be configured to access a control plan that corresponds to the constant speed running state of control plans corresponding to the current driving mode. In contrast, in S130, when a vehicle is in a transient state, for example, when accelerating or decelerating, the apparatus 10 may be configured to access a control plan that corresponds to the transient state of control plans corresponding to the current driving mode. The control plan in the transient state may be set to include different items of control information for gear ratios.

According to the above description, the apparatus may be configured to categorize a plurality of driving modes with different responsiveness of an engine based on the catalyst temperature, the operation period of the engine, and the time period, and set plans to operate the fuel injection system and the intake/exhaust system for each driving mode, to achieve optimized engine performance for each driving mode while satisfying emissions regulations. Further, since the apparatus may be configured to generate different control plans for the fuel injection system and the intake/exhaust system based on gear ratios in a transient state in which the responsiveness of an engine depends on the gear ratio, it may possible to achieve optimized engine performance for each gear ratio. In addition, as the engine performance is improved, the fuel efficiency may also be improved.

The method of controlling an engine of a vehicle according to an exemplary embodiment of the present invention may be performed by software executed by a processor of the controller. The components of the present invention are code segments for performing necessary work and programs or code segments may be stored on a processor-readable medium, or may be transmitted by computer data signals combined with carrier waves on a transmission medium or a communication network.

The computer-readable recording medium includes all kinds of recording devices storing computer-readable data. The computer-readable recording device may be a ROM, a RAM, a CD-ROM, a DVD_ROM, a DVD_RAM, a magnetic tape, a floppy disk, a hard disk, and an optical data storage unit. Further, the computer-readable recording medium may store and execute codes that are divided on a computer connected to a network and can be divisionally read by a computer.

The drawings referred to above and the detailed description of the present invention, provided as examples of the present invention, are used to explain the present invention, not limiting meanings or the scope of the present invention described in claims. Therefore, those skilled in the art may easily implement modifications from those described above. Further, those skilled in the art may remove some of the components described herein without deterioration of the performance or may add other components to improve the performance. In addition, those skilled in the art may change the order of the processes of the method described herein, depending on the environment of the process or the equipment. Therefore, the scope of the present invention should be determined by not the exemplary embodiments described above, but by the claims and equivalents.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An apparatus for controlling an engine of a vehicle, comprising:
   a memory configured to store program instructions; and
   a processor configured to execute the program instructions, the program instructions when executed configured to:
   detect a catalyst temperature using a sensor;
   determine an operation region of the engine based on revolutions per minute (rpm) of the engine and an amount of fuel consumption;
   determine any one of the driving modes as a current driving mode based on the catalyst temperature, the operation region, and present time; and
   operate a fuel injection system and the intake/exhaust system based on a control plan that corresponds to the current driving mode of control plans for the fuel injection system and the intake/exhaust system that are set to optimize responsiveness of the engine for a plurality of driving modes,
   wherein the program instructions when executed are further configured to obtain a determination value for a first driving mode by summing a first determination value based on the catalyst temperature, a second determination value based on the operation region, and a third determination value based on the present time, and determine the current driving mode based on the determination value for the first driving mode, and wherein the program instructions when executed are further configured to:
- apply different weight values to the determination value for the first driving mode, a determination value for a second driving mode obtained before the determination value for the first driving mode is obtained, and a determination value for a third driving mode corresponding to an average value obtained by accumulating determination values of driving modes of the previous day;
- obtain a determination value for a final driving mode by summing the determination values for the first, second, and third driving modes to which the weight values have been applied; and
- select any one of the driving modes as the current driving mode based on the determination value for the final driving mode.

2. The apparatus of claim 1, wherein
the control plans each include first control information of the fuel injection system and the intake/exhaust system in a constant speed running state and second control information of the fuel injection system and the intake/exhaust system in a transient state, and
the program instructions when executed are further configured to operate the fuel injection system and the intake/exhaust system based on the first control information in the constant speed running state, and operate the fuel injection system and the intake/exhaust system based on the second control information in the transient state.

3. The apparatus of claim 2, wherein the first control information includes fuel injection timing by the fuel injection system, pressure of a common rail, a supply amount by a turbocharger, and an exhaust gas recirculation amount.

4. The apparatus of claim 2, wherein the second control information includes a smoke fuel limit and an exhaust gas recirculation amount that depend on gear ratios.

5. The apparatus of claim 4, wherein the exhaust gas recirculation amount is set to decrease as the gear ratio increases.

6. A method of controlling an engine of a vehicle, comprising:
- detecting, by a controller, a catalyst temperature using a sensor;
- determining, by the controller, an operation region of the engine based on revolutions per minute (rpm) of the engine and an amount of fuel consumption;
- determining, by the controller, any one of the driving modes as a current driving mode based on the catalyst temperature, the operation region, and present time; and
- operating, by the controller, a fuel injection system and an intake/exhaust system based on a control plan that corresponds to the current driving mode, of control plans for the fuel injection system and the intake/exhaust system that are set to optimize responsiveness of the engine for a plurality of driving modes, wherein the determination of a driving mode includes:
- obtaining, by the controller, a determination value for a first driving mode by summing a first determination value according to the catalyst temperature, a second determination value according to the operation region, and third determination value according to the present time; and
- determining, by the controller, the current driving mode based on the determination value for the first driving mode, and wherein the determination of the current driving modes includes:
- applying, by the controller, different weight values to the determination value for the first driving mode, a determination value for a second driving mode obtained before the determination value for the first driving mode is obtained, and a determination value for a third driving mode that corresponds to an average value obtained by accumulating determination values of driving modes of the previous day;
- obtaining, by the controller, a determination value for a final driving mode by summing the determination values for the first, second, and third driving modes where the weight values have been applied; and
- selecting, by the controller, any one of the driving modes as the current driving mode based on the determination value for the final driving mode.

7. The method of claim 6, wherein the operation of a fuel injection system and an intake/exhaust system includes:
- operating, by the controller, the fuel injection system and the intake/exhaust system based on first control information when a vehicle is driven at a constant speed; and
- operating, by the controller, the fuel injection system and the intake/exhaust system based on second control information when a vehicle is in a transient state.

8. The method of claim 7, wherein the first control information includes a fuel injection timing by the fuel injection system, pressure of a common rail, a supply amount by a turbocharger, or an exhaust gas recirculation amount.

9. The method of claim 7, wherein the second control information includes a smoke fuel limit and an exhaust gas recirculation amount that depend on gear ratios.

10. The method of claim 9, wherein the exhaust gas recirculation amount is set to decrease as the gear ratio increases.

11. A non-transitory computer readable medium containing program instructions executed by a controller, the computer readable medium comprising:
- program instructions that detect a catalyst temperature using a sensor;
- program instructions that determine an operation region of the engine based on revolutions per minute (rpm) of the engine and an amount of fuel consumption;
- program instructions that determine any one of the driving modes as a current driving mode based on the catalyst temperature, the operation region, and present time; and
- program instructions that operate a fuel injection system and an intake/exhaust system based on a control plan that corresponds to the current driving mode, of control plans for the fuel injection system and the intake/exhaust system that are set to optimize responsiveness of the engine for a plurality of driving modes, wherein program instructions for the determination of a driving mode further include:
- program instructions that obtain a determination value for a first driving mode by summing a first determination value according to the catalyst temperature, a second determination value according to the operation region, and a third determination value according to the present time; and program instructions that determine the current driving mode based on the determination value for the first driving mode, and wherein the program instructions for the determination of the current driving mode further include:

program instructions that apply different weight values to the determination value for the first driving mode, a determination value for a second driving mode obtained before the determination value for the first driving mode is obtained, and a determination value for a third driving mode that corresponds to an average value obtained by accumulating determination values of driving modes of the previous day;

program instructions that obtain a determination value for a final driving mode by summing the determination values for the first, second, and third driving modes where the weight values have been applied; and program instructions that select any one of the driving modes as the current driving mode based on the determination value for the final driving mode.

12. The non-transitory computer readable medium of claim 11, wherein the program instructions for the operation of a fuel injection system and an intake/exhaust system further include:

program instructions that operate the fuel injection system and the intake/exhaust system based on first control information when a vehicle is driven at a constant speed; and program instructions that operate the fuel injection system and the intake/exhaust system based on second control information when a vehicle is in a transient state.

* * * * *